United States Patent
Shim et al.

(10) Patent No.: US 11,198,651 B2
(45) Date of Patent: Dec. 14, 2021

(54) SURFACE LAYER ON A CERAMIC MATRIX COMPOSITE

(71) Applicant: Rolls-Royce High Temperature Composites, Inc., Cypress, CA (US)

(72) Inventors: Sungbo Shim, Irvine, CA (US); Camila Bortoluzzi, Huntington Beach, CA (US); Andrew Phillip Kao, Corona, CA (US)

(73) Assignee: ROLLS-ROYCE HIGH TEMPERATURE COMPOSITES, INC., Cypress, CA (US)

( * ) Notice: Subject to any disclaimer, the term of this patent is extended or adjusted under 35 U.S.C. 154(b) by 109 days.

(21) Appl. No.: 16/227,775

(22) Filed: Dec. 20, 2018

(65) Prior Publication Data

US 2020/0199033 A1 Jun. 25, 2020

(51) Int. Cl.
*C04B 41/00* (2006.01)
*C04B 41/50* (2006.01)
(Continued)

(52) U.S. Cl.
CPC .......... *C04B 41/526* (2013.01); *C04B 41/009* (2013.01); *C04B 41/4896* (2013.01); *C04B 41/5059* (2013.01); *C04B 41/5096* (2013.01); *C04B 41/83* (2013.01); *C04B 41/87* (2013.01); *C04B 41/89* (2013.01)

(58) Field of Classification Search
CPC . C04B 41/526; C04B 41/009; C04B 41/4896; C04B 41/5059; C04B 41/5096; C04B 41/83; C04B 41/87; C04B 41/89
See application file for complete search history.

(56) References Cited

U.S. PATENT DOCUMENTS

| 4,242,106 A | 12/1980 | Morelock |
| 5,015,540 A | 5/1991 | Borom et al. |

(Continued)

FOREIGN PATENT DOCUMENTS

| DE | 102007063517 B3 | 1/2009 |
| EP | 1636148 A2 | 3/2006 |

(Continued)

OTHER PUBLICATIONS

Abramshe et al., "Effective Cleaning Methods and Best Practices of Synthetic Industrial Diamond," Mar. 1, 2007, rdmag.com, 8 pp.
(Continued)

*Primary Examiner* — Alex B Efta
(74) *Attorney, Agent, or Firm* — Shumaker & Sieffert, P.A.

(57) ABSTRACT

The disclosure describes a method for forming a surface layer of a ceramic matrix composite (CMC) article. The technique includes depositing a slurry on a surface of an infiltrated CMC. The slurry includes a carrier material, a binder, a plasticizer, and solid particles. The solid particles include a plurality of fine ceramic particles defining a fine particle average size less than about 5 micrometers. The method further includes drying the slurry to form an article having an outer surface layer that includes the solid particles on the infiltrated CMC. The method further includes machining at least a portion of the outer surface layer of the article. The method further includes infiltrating the article with a molten infiltrant to form a composite article.

16 Claims, 6 Drawing Sheets

(51) Int. Cl.
*C04B 41/52* (2006.01)
*C04B 41/83* (2006.01)
*C04B 41/87* (2006.01)
*C04B 41/89* (2006.01)
*C04B 35/634* (2006.01)
*C04B 35/573* (2006.01)
*C04B 35/626* (2006.01)
*C04B 35/628* (2006.01)
*C04B 41/48* (2006.01)

(56) References Cited

U.S. PATENT DOCUMENTS

| | | | |
|---|---|---|---|
| 5,840,221 A | 11/1998 | Lau et al. | |
| 5,952,100 A | 9/1999 | Corman et al. | |
| 6,245,424 B1 | 6/2001 | Lau et al. | |
| 6,403,158 B1 | 6/2002 | Corman | |
| 6,609,452 B1 | 8/2003 | McCormick et al. | |
| 6,820,334 B2 | 11/2004 | Kebbede et al. | |
| 6,855,428 B2 | 2/2005 | Lau et al. | |
| 7,378,362 B2 | 5/2008 | Nixon et al. | |
| 7,686,990 B2 | 3/2010 | Gray | |
| 7,842,335 B2 | 11/2010 | Skoog et al. | |
| 7,942,638 B2 | 5/2011 | Eichmann et al. | |
| 8,043,720 B2 | 10/2011 | Corman et al. | |
| 8,474,362 B1 | 7/2013 | Karandikar et al. | |
| 8,846,218 B2 | 9/2014 | Bouillon et al. | |
| 9,238,595 B2 | 1/2016 | Bouillon et al. | |
| 9,713,912 B2 | 7/2017 | Lee | |
| 2005/0158171 A1 | 7/2005 | Carper et al. | |
| 2005/0276931 A1 | 12/2005 | Che et al. | |
| 2006/0147622 A1 | 7/2006 | Gray | |
| 2006/0163773 A1 | 7/2006 | Gray | |
| 2007/0075455 A1 | 4/2007 | Marini et al. | |
| 2007/0092762 A1 | 4/2007 | Corman et al. | |
| 2011/0027556 A1* | 2/2011 | Kirby | C04B 41/009 428/215 |
| 2011/0027578 A1* | 2/2011 | Kirby | C04B 41/009 428/336 |
| 2011/0268577 A1 | 11/2011 | Bouillon et al. | |
| 2013/0009348 A1 | 1/2013 | Murata | |
| 2013/0122259 A1 | 5/2013 | Lee | |
| 2013/0157037 A1* | 6/2013 | Matsumoto | C04B 35/584 428/292.1 |
| 2013/0287941 A1 | 10/2013 | Gray | |
| 2014/0272274 A1 | 9/2014 | Lazur | |
| 2015/0004324 A1 | 1/2015 | Bouillon et al. | |
| 2016/0101561 A1 | 4/2016 | Walston et al. | |
| 2016/0159066 A1 | 6/2016 | Landwehr et al. | |
| 2016/0214907 A1 | 7/2016 | Shim et al. | |
| 2016/0230570 A1 | 8/2016 | Harris et al. | |
| 2016/0279744 A1 | 9/2016 | Harris | |
| 2016/0326064 A1 | 11/2016 | Shim et al. | |
| 2016/0356163 A1 | 12/2016 | Freeman et al. | |
| 2017/0247787 A1 | 8/2017 | Saha et al. | |
| 2017/0313627 A1 | 11/2017 | Shim et al. | |
| 2017/0313629 A1* | 11/2017 | Shim | C04B 35/565 |
| 2019/0185384 A1 | 6/2019 | Shim et al. | |
| 2019/0256427 A1 | 8/2019 | Shim et al. | |

FOREIGN PATENT DOCUMENTS

| | | |
|---|---|---|
| EP | 1683771 A1 | 7/2006 |
| EP | 3050863 A1 | 8/2016 |
| EP | 3135866 A1 | 3/2017 |
| EP | 3241817 A1 | 11/2017 |
| JP | 2000344582 A | 12/2000 |
| WO | 9824737 A1 | 6/1998 |

OTHER PUBLICATIONS

Extended European Search Report from counterpart EP Application No. 19210418.0 dated May 12, 2020, 7 pgs.
"DURAMAX Binders," The Dow Chemical Company, Form No. 233-01075-MM-0513, May 13, 2013, 5 pp.
U.S. Appl. No. 15/845,612, filed Dec. 18, 2017, by Shim et al.
"Ceramic matrix composite," wikipedia.org, retrieved from https://en.wikipedia.org/wiki/Ceramic_matrix_composite on Oct. 25, 2019, 12 pp.
Response to the communication pursuant to Rules 69 and 70a(1) dated Jun. 29, 2020, from counterpart European Application No. 19210418.0, filed Dec. 23, 2020, 62 pp.

* cited by examiner

SURFACE LAYER ON A CERAMIC MATRIX COMPOSITE

TECHNICAL FIELD

The present disclosure generally relates to techniques for forming a surface layer on a ceramic matrix composite article.

BACKGROUND

Ceramic matrix composite (CMC) materials may be useful in a variety of contexts where mechanical and thermal properties are important. For example, components of high temperature mechanical systems, such as gas turbine engines, may be made from CMCs.

SUMMARY

In some examples, the disclosure describes a method that includes depositing a slurry on a surface of an infiltrated ceramic matrix composite (CMC). The slurry includes a carrier material, a binder, a plasticizer, and solid particles. The solid particles include a plurality of fine ceramic particles defining a fine particle average size less than about 5 micrometers. The method further includes drying the slurry to form an article having an outer surface layer that includes the solid particles on the infiltrated CMC. The method further includes machining at least a portion of the outer surface layer of the article. The method further includes infiltrating the article with a molten infiltrant to form a composite article.

In some examples, the disclosure describes the method above in which the slurry is a second slurry and the particles are second solid particles. In this example, the method further includes, prior to depositing the second slurry on the surface of the infiltrated CMC, infiltrating a ceramic matrix composite (CMC) substrate with a first slurry to at least partially fill at least some inner spaces of the CMC substrate. The first slurry includes first solid particles comprising a first ceramic material. The technique further includes drying the first slurry to form the infiltrated CMC in which the infiltrated CMC includes the first solid particles.

In some examples, the disclosure describes an article that includes a CMC substrate, first solid particles, and an outer surface layer on the CMC substrate. The CMC substrate includes a reinforcement material and a plurality of inner spaces. The first solid particles include a first ceramic material. The plurality of first solid particles at least partially fill the inner spaces of the CMC substrate. The outer surface layer includes second solid particles, a binder, and a plasticizer. The second solid particles include a plurality of fine ceramic particles defining a fine particle average size less than about 5 micrometers. The second solid particles are greater than about 75 percent by volume (vol. %) of the plurality of fine ceramic particles.

The details of one or more examples are set forth in the accompanying drawings and the description below. Other features, objects, and advantages will be apparent from the description and drawings, and from the claims.

DETAILED DESCRIPTION

Figure 1A:
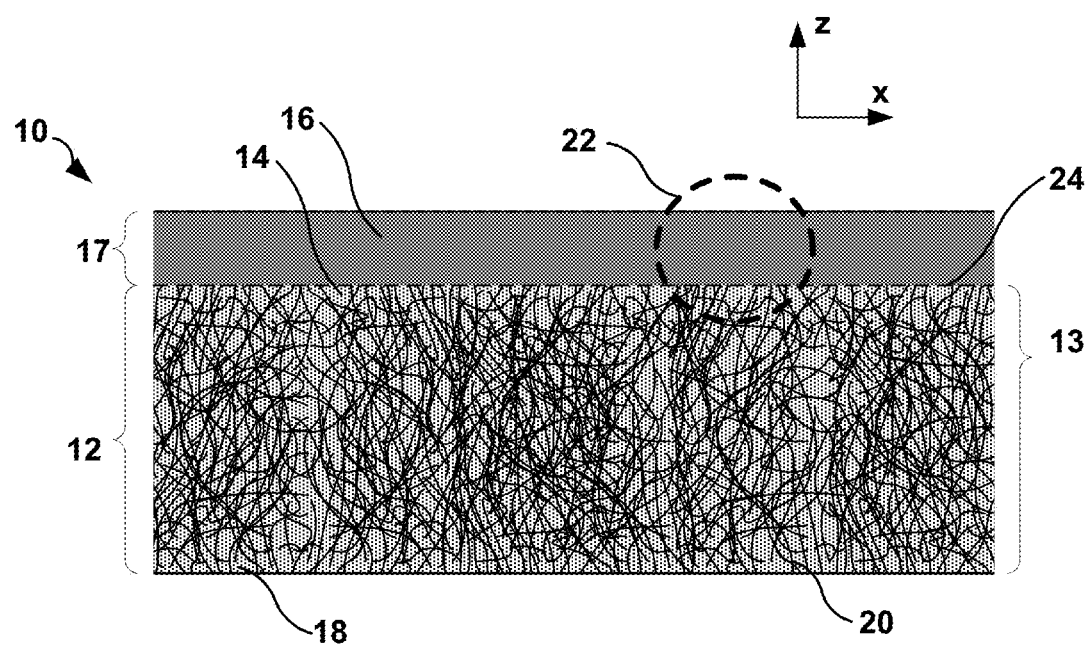
FIG. 1A is a conceptual diagram illustrating a cross-sectional view of an example article including a ceramic matrix composite (CMC) that includes a surface layer formed from a slurry including a plurality of fine ceramic particles, a binder, and a plasticizer.

The disclosure describes techniques for forming a surface layer of an article including a ceramic matrix composite (CMC) by depositing a slurry containing a ceramic material on a green body preform to form the surface layer and machining the surface layer prior to melt infiltration of the green body preform.

In some examples, an infiltrated CMC is formed by infiltrating a CMC substrate with a first slurry and drying the first slurry. A surface layer is formed on the infiltrated CMC by applying a second slurry to a surface of the infiltrated CMC and drying the second slurry to form a green body preform having an outer surface layer. The green body preform may be melt infiltrated to further densify the infiltrated CMC and form a CMC article.

During application of the first and second slurry, the addition of solids to the CMC substrate may change various dimensions of the CMC substrate, such that the resulting CMC article may not be within dimensional specifications. For example, the surface layer may include excess material formed from the second slurry coating (e.g., excess solid particles) that may be outside a tolerance. As another example, drying of the second slurry may cause cracks in the surface layer due to shrinkage of the surface layer as the solid particles agglomerate during drying, which may result in undesirable microstructure (e.g., cracks filled with silicon) in the surface layer after melt infiltration. This cracking may be especially prominent in surface layers that include high proportions of fine particles, which may cause greater shrinking of the surface layer than coarse particles when the surface layer is dried. To improve a smoothness of the surface layer, a surface layer may be formed from multiple thin applications of slurry, followed by drying each thin layer before applying the subsequent layer.

To remove at least some of this excess material, the excess material may be machined (e.g., polished or tumbled), which may facilitate conforming the article to dimensional tolerances, e.g., for fitting the article to another component. This excess material of the surface layer, having been melt infiltrated and/or sintered, may be substantially harder than the surface layer prior to melt infiltration, such as in the green body preform described above. However, the surface layer of the green body preform may not be sufficiently hard for machining. For example, the surface layer of a green body preform may be soft and brittle, such that machining the surface layer of the green body preform may cause cracking or chipping that brings the green body preform outside the dimensional tolerance.

According to principles of the disclosure, a surface layer may be formed on an infiltrated CMC and machined prior to melt infiltration with reduced cracking. In some examples, the surface layer may be formed from a slurry that includes ceramic particles, a binder, and a plasticizer. The binder may increase the strength of the surface layer of the green body preform and enable high proportions of fine ceramic particles to be used in the surface layer. The plasticizer may increase the flexibility of the surface layer of the green body preform to reduce cracking of the surface layer during machining.

By forming a surface layer using a slurry having a binder and a plasticizer and machining the surface layer prior to melt infiltration, a CMC article may be formed with fewer cracks in the surface layer and/or in a shorter amount of time than CMC articles that are not formed from a slurry that includes a binder and a plasticizer. For example, presence of the binder in the surface layer may increase the hardness of the surface layer to enable the surface layer may be machined prior to melt infiltration and improve the machining parameters that may be used. By enabling the surface layer prior to melt infiltration to be machined, a total machining time and/or cost may be reduced compared to machining after melt infiltration. As another example, presence of the binder in the surface layer during drying may increase adhesion between particles in the surface layer to reduce cracking in the surface layer. As yet another example, presence of the plasticizer in the surface layer during machining may increase a flexibility and reduce a brittleness of the surface layer to reduce chipping and cracking and improve handling of the CMC substrate.

FIG. 1A is a conceptual diagram illustrating an example article 10 including a CMC substrate 12 that includes reinforcement material 20. As shown inner spaces or pores 18 between reinforcement material 20 may be infiltrated with a first solid particles 14 by the deposition and drying of a first slurry, resulting in infiltrated CMC 13. Article 10 also includes an outer (or second) surface layer 17 including second solid particles 16 formed via the deposition and drying of a second slurry. The first slurry and the second slurry may be formulated with the same or different compositions.

In some examples, article 10 may be a component of a high temperature mechanical system. For example, article 10 may be a seal segment, a blade track, an airfoil, a blade, a vane, a combustion chamber liner, or the like, of a gas turbine engine.

Figure 1B:
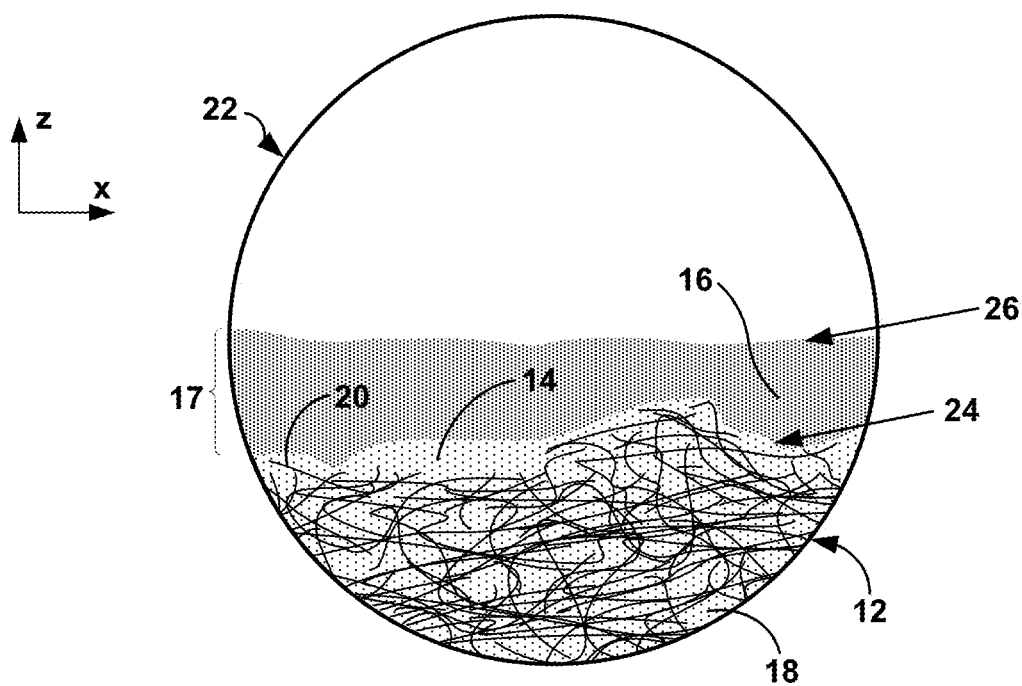
FIG. 1B is a conceptual diagram illustrating a cross-sectional view of a zoomed in section of the article from FIG. 1A.

CMC substrate 12 of article 10 includes reinforcement material 20, which defines inner spaces 18. In some examples, reinforcement material 20 may include continuous or discontinuous fibers. For example, reinforcement material 20 may include discontinuous whiskers, platelets, or particulates composed of SiC, $Si_3N_4$, $Al_2O_3$, aluminosilicate, $SiO_2$, or the like. In some examples, reinforcement material 20 may include continuous monofilament or multifilament fibers of one or more of the materials listed above, such as SiC. While FIGS. 1A and 1B illustrate reinforcement material 20 as including non-woven fibers, in some examples reinforcement material 20 may be include one or more layers of woven or braided fibers.

In some examples, reinforcement material 20 may include fibers coated with an optional fiber interface material that may be used to rigidize fibers, densify CMC substrate 12, or both, prior to the application of the first slurry. In some such examples, the fiber interface material may include, for example, pyrolytic carbon (PyC), boron nitride (BN), or the like and may be deposited on the fibers using any suitable technique such as chemical vapor infiltration (CVI), chemical vapor deposition (CVD), or the like.

Article 10 includes first solid particles 14 deposed in inner spaces 18 (e.g., pores) of CMC substrate 12 using a first slurry. In some examples, first solid particles 14 may include silicon carbide (SiC), silicon nitride ($Si_3N_4$), alumina ($Al_2O_3$), aluminosilicate (e.g., $Al_2SiO_5$), silica ($SiO_2$), boron carbide ($B_4C$), molybdenum carbide ($Mo_2C$), carbon (e.g., diamond particles), or combinations thereof. In some examples, first solid particles 14 may include at least one type of ceramic particle (e.g., SiC, $Si_3N_4$, $B_4C$, or $Mo_2C$ particles) having a uniformly or non-uniformly distributed particle size and optional diamond particles. First solid particles 14 of the first slurry may include particles having an average particle diameter sufficiently small to allow the ceramic particles to infiltrate inner spaces 18 (e.g., open pores) of CMC substrate 12 (e.g., an average particle diameter less than about 20 micrometers). In some examples, first solid particles 14 may be selected to include substantially the same (e.g., the same or nearly the same) composition used to form reinforcement material 20. In this way, first solid particles 14 may reduce the stress exerted on CMC substrate 12 as a result of any thermal expansion mismatches between reinforcement material 20 of CMC substrate 12 and first solid particles 14.

In some examples, first solid particles 14 may include a mixture of coarse and fine ceramic particles (e.g., coarse particles that define an average particle size of about 10 micrometers (µm) and about 20 µm and fine particles that define an average particle size of about 0.5 µm to about 5 µm) and diamond particles. In some such examples, as discussed further below, first solid particles 14 may be formulated to have substantially the same (e.g., the same or nearly the same) mixture of solid materials as the second slurry.

In some examples, the first slurry may include one or more optional additives. The additives may be used to tailor or alter the properties of the first slurry. For example, the one or more optional additives may include matrix precursors or other reactive elements that react with silicon metal or silicon alloy (e.g., carbon) during the melt infiltration process and contribute to the solid materials included in inner spaces 18. In some examples, the one or more optional additives may include a binder (e.g. polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK® 110 (available from Byk USA, Inc., Wallingford Conn.), or the like), or the like. In some examples, other additives such as a surfactant or wetting agent (e.g., DYNOL 607 surfactant available from Air Products) may be included in the slurry mixtures to improve wetting of the slurry. The selection and amount of the one or more optional additive components may depend on the intended application for article 10.

First solid particles 14 may be deposited from a first slurry using a suitable slurry infiltration technique. For example, a first slurry may be prepared that includes first solid particles 14 along with a carrier material (e.g., one or more solvents) and other optional additives. The at least one carrier material may assist with the deposition of first solid particles 14 within inner spaces 18. In some examples, the carrier material may include at least one compatible solvent, including, for example, water, ethanol, isopropyl alcohol, methyl ethyl ketone, toluene, or the like. During the deposition and drying of the first slurry, the carrier material may be substantially removed (e.g., removed or nearly removed) from article 10, leaving behind the solid contents of the first slurry (e.g. first solid particles 14).

In some examples, the first slurry may be formulated to include about 35% to about 65% by weight carrier material, about 35% to 65% by weight of first solid particles 14 (e.g., more than 50% by weight of the solid materials, e.g., ceramic particles, in the respective slurry), and up to 10% percent by weight optional additives (e.g., up to 8% by weight carbon material, up to 2% by weight surfactant, or the like).

During the slurry infiltration process, the first slurry may be deposited on a surface of CMC substrate 12 using any suitable means including, for example, spraying, dip coating, transfer molding, pressure or vacuum infiltration, painting, or the like. In some examples, a vacuum may optionally be drawn prior to slurry introduction to purge gas from inner spaces 18 of CMC substrate 12 and further enhance the infiltration process. The slurry infiltration may be conducted at any suitable temperature, including room temperature (between about 20° C. and about 35° C.). The first slurry infiltration may be enhanced by application of external pressure after slurry introduction, such as a pressure gradient of about one atmosphere. During the slurry infiltration process, the first slurry may be allowed to infiltrate the inner spaces 18 (e.g., pores) of CMC substrate 12. After infiltration, the first slurry may be dried to remove the carrier material, leaving behind the solid contents of the first slurry (e.g., first solid particles 14). In some examples, the infiltration process may also form a surface layer (e.g. a first surface layer) (not shown) on CMC substrate 12 that includes first solid particles 14. In such examples, the surface layer formed by the first slurry may define a thickness between about 0 micrometers to about 750 micrometers. In some examples, the surface layer formed by the first slurry may define a thickness less than about 125 micrometers or may be substantially indistinguishable from the major surface of CMC substrate 12. In other examples, article 10 may not include a surface layer formed by the first slurry.

In some examples, the infiltration of CMC substrate 12 with the first slurry may be performed using a mold. For example, CMC substrate 12 may be placed and sealed in the inner cavity of a mold. The first slurry including first solid particles 14 may be injected into the mold under pressure allowing the first slurry to coat CMC substrate 12 and infiltrate inner spaces 18. In some examples, the mold may be configured to define an inner cavity sufficiently sized to allow for the formation of a first surface layer (not shown) during the infiltration process. The mold may be formed of any suitable material including, for example, graphite, silica, alumina, or the like. The material from which the mold is formed may be selected to allow release of article 10 after completion of the infiltration step, and to be sufficiently non-reactive with the materials used in forming article 10.

Figure 2:
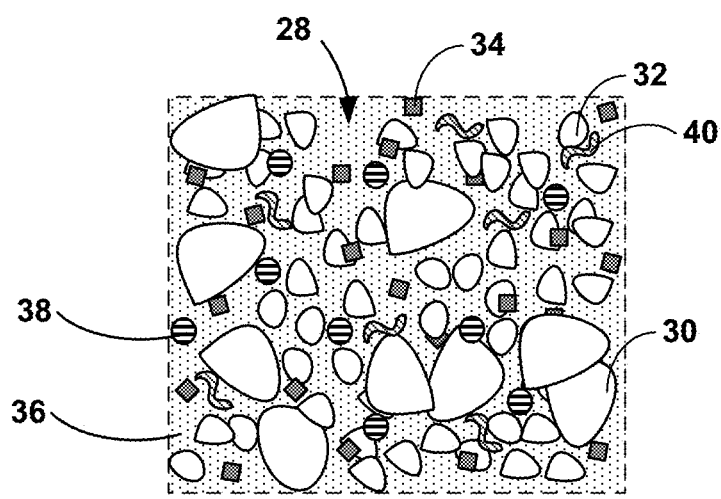
FIG. 2 is an enlarged view of an example of a second slurry including a plurality of coarse and fine ceramic particles, a binder, and a plasticizer that may be used to form the outer surface layer of the article of FIGS. 1A and 1B.

Article 10 also includes outer surface layer 17 formed by the deposition and drying of a second slurry on major surface 24 of infiltrated CMC 13. In some examples, deposition and drying of the second slurry may help to level the second surface 26 of resultant article 10. For example, FIG. 2 illustrates a conceptual diagram of a cross-sectional view of a zoomed in section 22 of article 10 from FIG. 1, which exaggerates the microstructure of article 10. As shown in FIG. 2, the deposition of the first slurry including first solid particles 14 infiltrates at least some inner spaces 18 of CMC substrate 12. In some examples, due to the structure of CMC substrate 12, resultant major surface 24 of infiltrated CMC 13 may define a textured surface. For example, the structure of CMC substrate 12 may include multiple peaks and valleys on major surface 24 due to, for example, the varied thickness created by underlying reinforcement material 20. In some examples, the formation of outer surface layer 17 may reduce the presence of the peaks and valleys along outer major surface 26, thereby establishing a smoother surface finish. The increased smoothness of outer major surface 26 may assist with subsequent machining processes, for example, by reducing the amount of surface material (e.g. solid particles 16) that needs to be removed to establish a substantially planar (e.g., planar or nearly planar) surface. In some examples, the smoothness of outer surface layer 17 may be improved by formulating the second slurry to have a viscosity less than about 500 cP (e.g., less than 300 cP) to maintain sufficient flowability of the second slurry during application. Additionally or alternatively, the smoothness of outer surface layer 17 may be improved by mechanically smoothing the surface of the second slurry (e.g., scraping, rolling, spreading, or the like) once the slurry has been deposited on infiltrated CMC 13 prior to drying the second slurry to remove any high spots and assist with leveling of solid particles 16.

The deposition and drying of the second slurry may also help protect the underlying reinforcement material 20 during subsequent processing as compared to applying only a single slurry to CMC substrate 12. For example, due to the infiltration process of the first slurry, the resultant first surface layer, if any, formed on CMC substrate 12 by first solid particles 14 may be discontinuous and define a variable thickness. The discontinuity of the first surface layer formed by the first slurry may establish sections where the first surface layer becomes relatively thin. In some examples, subsequent machining of major surface 24 of infiltrated CMC 13 may cause reinforcement material 20 (e.g., fibers) to become partially exposed or damaged, which may generate detrimental effects to the durability of article 10. By depositing and drying the second slurry on major surface 24, the buildup of second solid particles 16 may provide a sufficient coverage by outer surface layer 17 of solid materials such that reinforcement material 20 is sufficiently protected during subsequent machining. Once the second slurry has dried, outer surface layer 17 may be machined to remove any high spots in the layer (e.g., excess solid particles 16) without damaging or contacting the underlying reinforcement material 20 of CMC substrate 12. A subsequent molten infiltrant may then be applied to further densify article 10. In some examples, outer surface layer 17 may define an average thickness as measured in the z-direction of FIGS. 1A and 1B between about 10 micrometers (about 0.5 mil) to about 750 micrometers (about 30 mil), such as between about 25 micrometers (about 1 mil) and about 250 micrometers (about 10 mil).

The second slurry may have a composition that is selected such that the outer surface layer may be machined prior to melt infiltration. FIG. 2 is an enlarged view of an example of a second slurry 28 that may be used to form outer surface layer 17 that includes second solid particles 16 mixed with a suitable carrier material 36 (e.g., solvents), a binder 38, a plasticizer 40, and any optional additives. In some examples, solid particles 16 may include a plurality of coarse ceramic particles 30, a plurality of fine ceramic particles 32, and any optional reactive particles 34 (collectively "second solid particles 16").

Second slurry 28 may be prepared and applied to infiltrated CMC 13 using a similar technique to those discussed with respect to the deposition of the first slurry. For example, second slurry 28 may be deposited on a surface of infiltrated CMC 13 by spraying, painting, dip coating, transfer molding, pressure or vacuum infiltration, or the like. The application of second slurry 28 may be conducted at any suitable temperature, including room temperature (between about 20° C. and about 35° C.). In some examples, the deposition process of second slurry 28 may include application of external pressure after the slurry application, such as a pressure gradient of about one atmosphere. Once applied, second slurry 28 may be dried to remove carrier material 36, thereby depositing the solid materials including second solid particles 16, binder 38, and plasticizer 40 on infiltrated CMC 13 (e.g., on major surface 24) to form outer surface layer 17.

Carrier material 36 may include at least one solvent compatible with second solid particles 16, including, for example, water, ethanol, isopropyl alcohol, methyl ethyl ketone, toluene, or the like. In some examples, second slurry 28 may include about 30 percent by volume (vol. %) to about 60 vol. % carrier material 36 and about 70 vol. % to about 40 vol. % solid materials (e.g., second solid particles 16). During drying of second slurry 28, carrier material 36 may be substantially removed (e.g., removed or nearly removed) second slurry 28, leaving behind the solid contents of second slurry 28 (e.g., second solid particles 16), binder 38, and plasticizer 40.

In some examples, the composition of second solid particles 16 may be selected to include one or more of substantially the same (e.g., the same or nearly the same) solid particles used in first solid particles 14 (e.g., SiC, $Si_3N_4$, $Al_2O_3$, $Al_2SiO_5$, $SiO_2$, $B_4C$, $Mo_2C$, diamond, or the like) and/or materials that are used in forming any additional outer layers (e.g., bond coats, thermal barrier coatings, environmental coating, or the like) that are subsequently applied to outer surface layer 17. For example, second slurry 28 may be prepared to have a composition that is substantially the same (e.g., the same or nearly the same) as the first slurry. In other examples, second slurry 28 may include at least some particles in second solid particles 16 that are the same as at least some particles in first solid particles 14, or the solid particle contents of the first slurry and second slurry 28 may be substantially the same, but the additive content may be different. In this way, second solid particles 16 may reduce the stress exerted on article 10 and/or additional outer layers as a result of any thermal expansion mismatches between adjacent layers of article 10.

As shown in FIG. 2, second slurry 28 may, in some examples, include a plurality of coarse ceramic particles 30 and a plurality of fine ceramic particles 32. The coarse and fine ceramic particles may include particles of silicon carbide (SiC), silicon nitride ($Si_3N_4$), alumina ($Al_2O_3$), aluminosilicate (e.g., $Al_2SiO_5$), silica ($SiO_2$), boron carbide ($B_4C$), molybdenum carbide ($Mo_2C$), or a combination thereof. In some examples, coarse ceramic particles 30 may define an average particle size of between about 10 μm and about 20 μm, with a standard deviation of less than about ±3 μm. In some examples, fine ceramic particles 30 may define an average particle size of about 0.5 μm to about 5 μm, with a standard deviation of less than about ±0.5 μm.

In some examples, the relative ratio of coarse ceramic particles 30 to fine ceramic particles 32 to reactive particles 34 may be selected to deposit relatively high density of solid particles (e.g., ceramic materials) on CMC 13 as outer surface layer 17, while maintaining sufficiently sized interstices within outer surface layer 17 (e.g., the pathways or spacing between adjacent second solid particles 16) to allow the melt infiltrant to penetrate the inner recesses of outer surface layer 17 and, in some examples, inner spaces 18. In some examples, coarse ceramic particles 30 may account for 0 vol. % to about 50 vol. % of the solid material (e.g., second solid particles 16) in second slurry 28 and fine ceramic particles 32 may account for about 50 vol. % to 100 vol. % of the solid material (e.g., second solid particles 16) in second slurry 28. In some examples, the volumetric ratio of coarse ceramic particles 30 to fine ceramic particles 32 may between 0:1 to about 1:1.

In some examples, second slurry 28 may include a high composition of fine ceramic particles 30, such that fine ceramic particles 30 may account for greater than about 75 vol. % of the solid material in second slurry 28. As a result of this high proportion of fine ceramic particles 30, outer surface layer 17 may have a corresponding high proportion of fine ceramic particles 30 in infiltrated CMC 13 prior to melt infiltration. This high proportion of fine ceramic particles may form a smoother outer surface 26 of outer surface layer 17 than slurries including higher proportions of coarse particles. In some instances, a high proportion of fine ceramic particles 30 may increase a likelihood that outer surface layer 17 may shrink during drying and crack. However, as will be explained below, second slurry 28 may include additional constituents, such as binder 38 and plasticizer 40, that may reduce a likelihood that outer surface layer 17 forms cracks during drying, even with a high proportion of fine ceramic particles 30.

In some examples, the plurality of fine ceramic particles 32 within second slurry 28 may increase the relative amount of solid material along major surface 24 (compared to a slurry that includes only coarse ceramic particles 30), or that becomes infiltrated in CMC 13 due to ability of the smaller sized fine particles to infiltrate within any pores that remain in CMC substrate 12 after the deposition of first solid particles 14 and to pack more efficiently (leaving less free space between particles). Additionally, or alternatively, fine ceramic particles 32 may also increase the capillary force among second solid particles 16, which as described further below, may help reduce the exudation of the molten infiltrant (e.g., silicon or silicon alloy) during subsequent processing.

In some examples, coarse ceramic particles 30 may help to maintain sufficiently sized interstices (e.g., pathways) within the deposited outer surface layer 17 to allow for infiltration of the molten metal or metal alloy infiltrant within the inner recesses of CMC 13 during subsequent processing. Additionally, or alternatively, in some examples, the presence of coarse ceramic particles 30 in second slurry 28 may help reduce or prevent shrinkage and or cracking of the outer surface layer 17 as second slurry 28 is dried compared to a coating including only fine ceramic particles 32.

Second slurry 28 includes a binder 38. While illustrated in FIG. 2 as a solid particle, binder 38 may include any mixture of solids and liquids. Binder 38 may be configured to provide green strength (i.e., strength of green body preform) to a preform prior to melt infiltration. For example, binder 38 may be configured to bind at least a portion of the plurality of second solid particles 16, such as the plurality of coarse ceramic particles 30 or the plurality of fine ceramic particles 32, through adhesion or cohesion. Binder 38 may include any binder capable of increasing adhesion between second solid particles 16 including, but not limited to, DURAMAX, styrene/acrylic copolymer, acrylate co-polymers, latex co-polymers, polyvinyl pyrrolidone co-polymers, polyethyleneimine (PEI), polyethylene glycol (PEG), or the like. In some examples, second slurry 28 may include greater than about 0.1 percent by weight (wt. %) of binder 38. For example, an article that includes greater than about 0.1 wt. % of binder 38 may have a higher green strength than an article that does not include binder 38. In some examples, second slurry 28 includes less than about 5 wt. % of binder 38. For example, second slurry 28 that includes greater than 5 wt. % of binder 38 may have a high viscosity that inhibits application of second slurry 28, such as through using a spray. In some examples, second slurry 28 includes about 0.1 percent by weight (wt. %) to about 5 wt. % of binder 38. Binder 38 may be selected for a variety of properties including, but not limited to, viscosity, glass transition temperature, or the like. After machining of outer surface layer 17 prior to melt infiltration, binder 38 may be removed, such as through burn-off during sintering.

In some examples, binder 38 may be selected to increase a strength of outer surface layer 17 prior to melt infiltration. For example, during drying of second slurry 28, second solid particles 16 may shrink, which may form cracks in outer surface layer 17. By including binder 38 in second slurry 28, binder 38 may assist in adhering the second solid particles 16 together, which may reduce cracking in outer surface layer 17.

In some examples, binder 38 may be selected to increase a hardness of outer surface layer 17 prior to melt infiltration. For example, machining of an outer surface layer that does not include a binder may cause crumbling of the outer surface layer due to poor adhesion of the solid particles in the outer surface layer. By including binder 38 in second slurry 28, binder 38 may promote adhesion between second solid particles 16, increasing a hardness of outer surface layer 17 and enabling outer surface layer 17 to be machined prior to melt infiltration.

Figure 6:
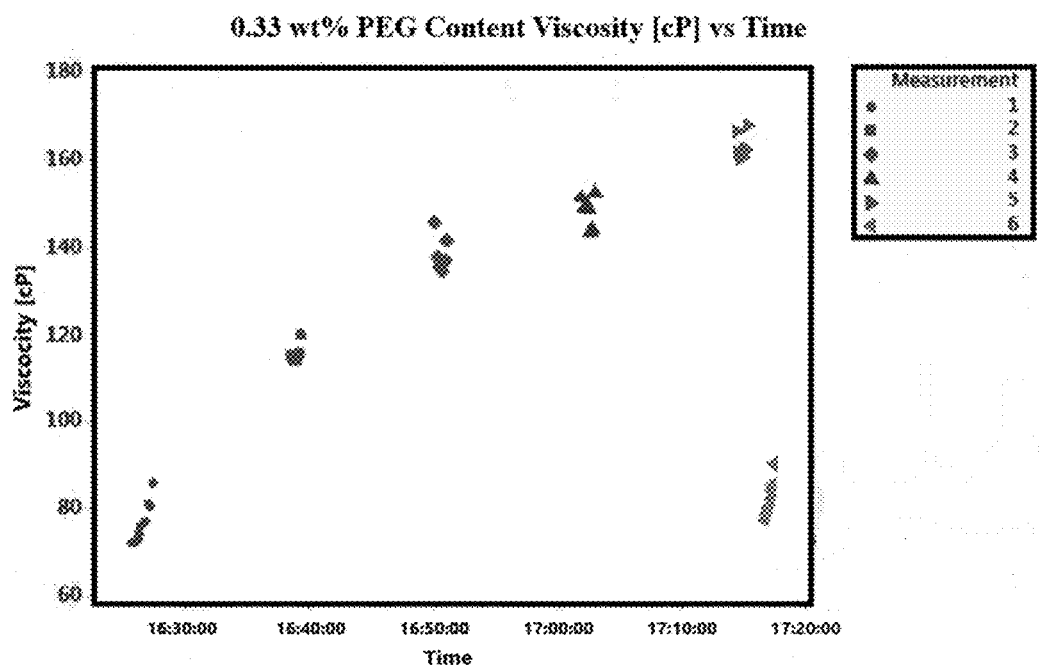
FIG. 6 is a graph of viscosity for six different measurements of a 0.33 wt % polyethylene glycol composition over time.
Figure 7:
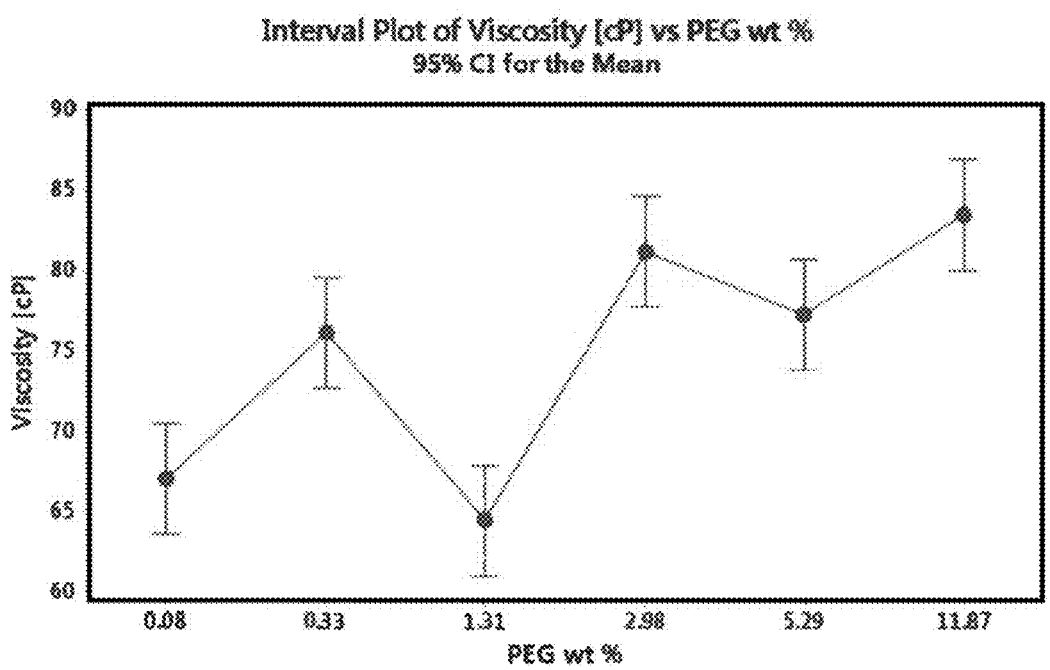
FIG. 7 is a graph of viscosity for the slurry with six polyethylene glycol content.

Second slurry 28 also includes a plasticizer 40. While illustrated in FIG. 2 as solid particles, plasticizer 40 may include any mixture of solids and liquids. Plasticizer 40 may be configured to increase a flexibility/plasticity and/or decrease a viscosity of outer surface layer 17. For example, an article prior to melt infiltration that includes plasticizer 40 may have reduced brittleness and/or increased abradability when outer surface layer 17 is dry. Plasticizer may include any plasticizer capable of increasing plasticity of outer surface layer 17 including, but not limited to, poly ethylene glycol, poly ethylene imine, ammonium polyacrylate, polyvinyl butyral, a phosphate ester, polyethylene imine, BYK® 110 (available from Byk USA, Inc., Wallingford Conn.), or the like. In some examples, second slurry 28 includes greater than about 0.1 percent by weight (wt. %) of plasticizer 40. For example, a slurry that includes greater than about 0.1 wt. % of plasticizer 40 may have flexibility sufficient to enable green machining of the article. In some examples, second slurry 28 includes less than about 12 wt. % of plasticizer 40. For example, as shown in FIGS. 6 and 7 below, second slurry 28 that includes less than about 12 wt. % of plasticizer 40 may be applied more easily. In some examples, second slurry 28 includes between about 0.1 percent by weight (wt. %) to about 12 wt. % of plasticizer 40. For example, second slurry 28 may include between about 0.5 wt. % to about 5 wt. % of plasticizer 40. Plasticizer 40 may be selected for a variety of properties including, but not limited to, viscosity, glass transition temperature, or the like. In some examples, such as examples in which second slurry 28 is applied as a spray, plasticizer 40 may be selected (e.g., composition or material selection) such that second slurry 28 has a viscosity less than about 100 cP, such as less than about 90 cP. For example, as viscosity increases, second slurry 28 may become more difficult to spray. However, in examples in which second slurry 28 is applied as a dip or brush coating, plasticizer 40 may be selected for a higher viscosity.

In some examples, plasticizer 40 may be selected to increase flexibility of outer surface layer 17 prior to melt infiltration. For example, machining an outer surface layer that does not include a plasticizer may cause chipping or cracking due to brittleness of the outer surface layer. By including plasticizer 40 in second slurry 28, plasticizer 40 may increase a flexibility of outer surface layer 17 to reduce chipping or cracking and improve handling of infiltrated CMC 13 prior to melt infiltration.

In some examples, second slurry 28 may include a plurality of reactive particles. The plurality of reactive particles may be configured to react with other components of the infiltrated CMC. For example, the presence of reactive particles 34 in outer surface layer 17 may help reduce or inhibit the formation of silicon nodules on second surface 26 of article 10 by reacting with the molten silicon infiltrant to form SiC. In some examples, reactive particles 34 may provide a reactive carbon source, such as diamond or graphite particles, in second solid particles 16 that can be converted to a metal carbide during subsequent melt infiltration processing. A variety of reactive particles may be used including, but not limited to: carbon sources, such as graphite, diamond, and carbon black; molybdenum; tungsten; or the like. In some examples, reactive particles 34 may define an average reactive particle diameter between about 0.1 μm to about 5 μm and account for between about 1 vol. % and about 10 vol. % of the solid material in second slurry 28. In some examples the reactive particles 34 may account for between about 2 vol. % and about 10 vol. % of the solid material (e.g., second solid particles 16) in second slurry 28, or between about 3 vol. % and about 10 vol. % of the solid material (e.g., second solid particles 16) in second slurry 28.

In some examples, an amount and size of reactive particles 34 may be selected so substantially all (e.g., all or nearly all) of the reactive particle material reacts with the metal or metal alloy infiltrant to form, for example, a metal carbide. In some examples, smaller sized reactive particles may be more efficiently converted to, for example, metal carbide, due to a higher surface area-to-volume ratio of the reactive particles.

In some examples, second slurry 28 may also include a plurality of diamond particles. Including diamond particles in second slurry 28, and optionally the first slurry, may provide one or more advantages compared to other carbon sources such as carbon black or graphite. For example, diamond particles may contain a lower quantity of impurities compared to other carbon sources, which may correspond to a lower amount of impurities introduced into article 10. Diamond particles also have a higher relative density (e.g., about 3.5 g/cm$^3$) compared to other carbon sources (e.g., density of carbon black is about 1.8-2.1 g/cm$^3$). As a result, the amount of carbon loading in the slurry (e.g., the weight percent (wt. %) of free carbon in second slurry 28) may be much higher for diamond particles compared to other carbon sources added to the slurry utilizing the same relative volume percentage. Additionally, diamond particles have been found to have a relatively small impact on the viscosity of a slurry compared to other carbon sources. As a result, the volume percentage of diamond particles added to the slurry (e.g., second slurry 28) may be relatively high (e.g., about 10 vol. %) compared to other carbon sources without significantly increasing the viscosity of the slurry. A slurry with viscosity that is too high is no longer viable as a slurry. In some examples, the combination of the higher density of diamond particles and the higher volume percentage of diamond particles added to second slurry 28 compared to other carbon sources may significantly increase the amount of carbon material deposited in outer surface layer 17 (or if incorporated in the first slurry, the amount of carbon material infiltrated within CMC substrate 12), significantly increase the packing density of the outer surface layer 17, or a combination of both.

Second slurry 28 may also include one or more optional additives. Such additives may be used to tailor or alter the properties of second slurry 28. In some examples, other additives such as a surfactant or wetting solution (e.g., DYNOL 607 surfactant available from Air Products) may be included in second slurry 28 to improve wetting of major surface 24 with the second slurry 28. The selection and amount of the one or more optional additive components may depend on the intended application for article 10. In some examples, the one or more optional additives may account for up to about 20 vol. % of second slurry 28.

The relative amount of second solid particles 16 in second slurry 28 may be selected to provide a relatively high solid loading content of second solid particles 16 (e.g., up to about 70 vol. %) compared to other materials yet still maintain a workable viscosity (e.g., less than about 1000 centipoise (cP) for dip coating or less than 100 cP for spray coating). In some examples, the relatively high solid loading content of second slurry 28 may also reduce that amount of molten metal infiltrant material used to during subsequent melt infiltration cycles and, ultimately, may reduce an amount of excess metal infiltrant left in final CMC article (e.g., article 10 after subsequent melt infiltration). Because unreacted metal infiltrant (e.g., silicon or silicon alloy) may negatively affect properties of the final CMC article, reducing the amount of metal infiltrant that remains in the final CMC article may improve properties of the article.

In some examples, the deposited and dried first solid particles 14 of the first slurry may allow for outer surface layer 17 to obtain a higher solid content percentage (e.g., volume percentage of deposited solid materials occupying a given volume) compared to the solid content percentage that may otherwise be established if the only a single slurry mixture were applied to CMC substrate 12. For example, in examples in which the first slurry and second slurry 28 are substantially the same compositions (e.g. the same or nearly the same), the deposition and drying of first solid particles 14 will infiltrate inner spaces 18 of CMC substrate 12. Solid particles 14 deposited in inner spaces 18 may define a first solid content percentage. The subsequent deposition and drying of second slurry 28 forms outer surface layer 17, which may define a second solid content percentage that is greater (e.g., more dense) than the first solid content percentage, despite the first slurry and second slurry 28 having substantially the same compositions. In some examples, the second solid content percentage may be greater than the first solid content percentage by as much as 16 percent (e.g., a ratio of the respective solid content percentages). While not wanting to be bound to a specific scientific principle, it is believed that the greater solid content percentage of outer surface layer 17 may be the result of carrier material 36 (e.g., solvents) from second slurry 28 being wicked into first solid particles 14 (e.g., wicked into inner spaces 18). The movement of carrier material 36 into first solid particles 14 pulls the solid materials of the second slurry (e.g. solid particles 16) toward major surface 24, which may result in outer surface layer 17 having a tighter packing arrangement of the solid materials and overall higher solid content percentage compared to the solid content within inner spaces 18 or within a surface layer formed by only a single application of a slurry mixture (e.g., the first surface layer formed by the first slurry if the second slurry were not applied to article 10). The greater solid content percentage of outer surface layer 17 may improve the durability of article 10, reduce the chance of cracking during subsequent machining of the outer surface, or both.

Forming outer surface layer 17 using second slurry 28 having a plurality of fine ceramic particles 32, a binder 38, and a plasticizer 40 may provide one or more advantages compared to other slurry mixtures that do not include binder 38 or plasticizer 40. By forming outer surface layer 17 using second slurry 28 having binder 38 and plasticizer 40 and machining outer surface layer 17 prior to melt infiltration, a CMC article may be formed with fewer cracks and/or in a shorter amount of time than CMC articles that are not formed from second slurry 28 that includes binder 38 and plasticizer 40. For example, presence of binder 38 in outer surface layer 17 may increase the hardness of outer surface layer 17 to enable outer surface layer 17 to be machined prior to melt infiltration and improve the machining parameters that may be used during machining of outer surface layer 17. By enabling the softer surface layer prior to melt infiltration to be machined, a total machining time and/or cost may be reduced compared to machining outer surface layer 17 after melt infiltration. As another example, presence of binder 38 in outer surface layer 17 during drying of second slurry 28 may increase adhesion between solid particles 16 in outer surface layer 17 to reduce cracking in outer surface layer 17. As yet another example, presence of plasticizer 40 in outer surface layer 17 during machining may increase a flexibility and reduce a brittleness of outer surface layer to reduce chipping and cracking and improve handling of CMC substrate 13.

The melt infiltration process may increase the overall density of article 10, e.g., by filling voids between particles of first solid particles 14 and voids between particles of solid particles 16. In some examples, the molten metal infiltrant may include Si metal or Si metal alloy, B metal or B metal alloy, Al metal or Al metal alloy, Y metal or Y metal alloy, Ti metal or Ti metal alloy, Zr metal or Zi metal alloy, or the like. In some examples, the molten metal infiltrant includes Si metal or Si metal alloy (e.g., Si and BN powder).

In some examples, article 10 may also include one or more optional outer coatings applied to outer surface layer 17 including, for example, a bond coat, an environmental barrier coating (EBC), an abradable coating layer, a calcia-magnesia-aluminosilicate (CMAS)-resistant layer, or the like. In some examples, a single layer of the one or more optional outer coatings may perform two or more of these functions.

Figure 3:
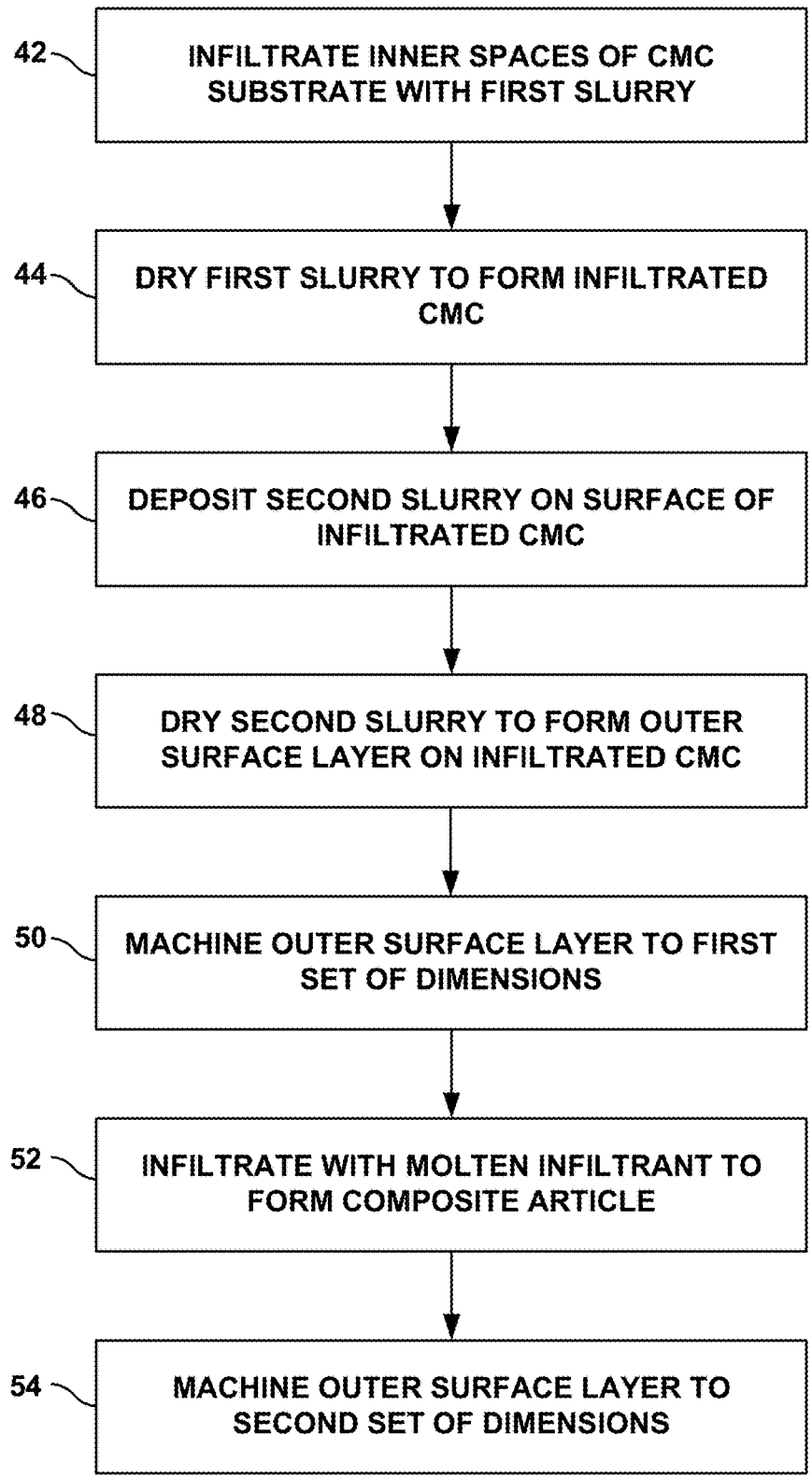
FIG. 3 is a flow diagram illustrating an example technique for forming an article including a ceramic matrix composite (CMC) that includes a surface layer formed from a slurry and machined prior to melt infiltration.

The first and second slurries may be applied to CMC substrate 12 using any suitable technique. For example, FIG. 3 is a flow diagram illustrating an example technique for forming a composite article that includes an outer surface layer 17 formed from via the deposition and drying of a second slurry. While technique of FIG. 3 is described with concurrent reference to the conceptual diagram of FIGS. 1A, 1B, and 2, in other examples, the technique of FIG. 3 may be used to form another article, or article 10 may be formed using a technique different than that described in FIG. 3. In some examples, the technique of FIG. 3 may include various pre-processing steps not shown in FIG. 3.

The technique of FIG. 3 includes infiltrating CMC substrate 12 with a first slurry including first solid particles 14 (42). CMC substrate 12 may be manufactured using one or more of the techniques discussed above. For example, the technique may include any of forming a fiber preform, coating the fiber preform with a fiber interphase, and rigidizing the fiber preform with silicon carbide through chemical vapor infiltration to form CMC substrate 12. Additionally, or alternatively, CMC substrate 12 may be acquired in prefabricated form. The first slurry may be applied to CMC substrate 12 using any suitable technique that allows first solid particles 14 to at least partially infiltrate the inner spaces 18 (e.g., pores) of CMC substrate 12.

Once infiltrated, the first slurry may be dried (44) to remove the carrier material from the slurry, thereby leaving behind the solid materials of the first slurry (e.g. first solid particles 14) in inner spaces 18 of CMC substrate 12 and, in some examples, form a first surface layer (not shown) on CMC substrate 12. The drying process results in infiltrated CMC 13. The drying may be conducted in any suitable manner, and in various examples, the infiltrated CMC 13 can be dried at room temperature under vacuum at about 1 Torr, or may be dried at ambient pressure at a temperature of up to about 150° C.

The technique of FIG. 3 also includes depositing a second slurry 28 that includes second solid particles 16 on infiltrated CMC 13 (46). In some examples, second solid particles 16 include a high composition of fine ceramic particles. Second slurry 28 may be applied to the infiltrated CMC 13 using any suitable technique. In some examples, second slurry 28 may be deposited on infiltrated CMC 13 using the same technique used to apply the first slurry.

Second slurry 28 may be subsequently dried to produce an outer surface layer 17 including the solid materials (e.g., solid particles 16) (48). The drying may be conducted in any suitable manner, and in various examples, second slurry 28 can be dried at room temperature under vacuum at about 1 Torr, or may be dried at ambient pressure at a temperature of up to about 150° C. In some examples, as second slurry 28 dries, the carrier material 36 of second slurry 28 may be wicked into the first solid particles 14 (e.g., inner spaces 18 and optional surface layer formed by the first slurry). The wicking effect may cause the solid materials of the second slurry (e.g., solid particles 16) to form outer surface layer 17 such that the layer defines a higher solid content percentage compared to the solid content percentage within inner spaces 18 formed by the first slurry having a similar composition. In some examples, the wicking effect may help increase the solid content percentage of outer surface layer 17 compared to first solid particles 14 in inner spaces 18 by as much as 16%.

The technique of FIG. 3 also includes machining outer surface layer 17 to a first set of dimensions (50). For example, as discussed above, outer surface layer 17 may include binder 38 and plasticizer 40 that enables outer surface layer 17 to be machined with reduced cracking and/or chipping. As such, a portion of machining of outer surface layer 17 that would be performed after melt infiltration may be performed prior to melt infiltration when CMC substrate 13 is softer and easier to machine. Outer major surface 26 of outer surface layer 17 may be machined (e.g., leveled) to a first set of dimensions that is closer to a final machining parameters or dimensions than if outer surface layer 17 had not been machined. The machining of outer major surface 26 (50, 54) may be used to remove at least some of outer surface layer 17 including excess second solid particles 16 to define a contact surface for contacting another component (e.g., the one or more optional outer coating). The machining may include any type of mechanical machining, including, for example, milling, turning, shaping, planing, grinding, polishing, tumbling, grit blasting, or the like. The machining may remove at least some of the excess second solid particles 16 to reduce a dimension of the composite article and facilitate fit of the composite article with another component. In some examples, a majority of excess material representing a difference between dimensions of article 10 prior to machining and final dimensions of a composite CMC article after final machining may be removed prior to melt infiltration. However, there may be dimensional changes during melt infiltration, such that outer surface layer 17 may be further machined to a second set of dimensions after melt infiltration, as discussed in step 54 below.

The technique of FIG. 3 also includes infiltrating article 10 with a molten infiltrant to form a composite CMC article (52). The molten infiltrant may include a molten metal or molten alloy infiltrant. The molten metal or molten alloy infiltrant may wick between particles of second solid particles 16 and between particles of first solid particles 14 of article 10 to occupy the interstices between the respective particles of first and second solid particles 14 and 16. In some examples, the melt infiltration process may densify the resultant composite article to define an average porosity of less than about 5%, or less than about 3%, or less than about 1%.

In some examples, the molten metal or molten alloy infiltrant may include Si metal or Si metal alloy, B metal or B metal alloy, Al metal or Al metal alloy, Y metal or Y metal alloy, Ti metal or Ti metal alloy, Zr metal or Zi metal alloy, or the like. In some examples, the molten metal infiltrant includes Si metal or Si metal alloy (e.g., Si and BN powder). In some examples, the temperature for metal alloy infiltration such as Si metal infiltration is between about 1400° C. and about 1500° C. Under these conditions, the duration of the infiltration may be between about 15 minutes and about 4 hours, or between about 20 minutes and about 60 minutes. The melt infiltration process (52) may optionally be carried out under vacuum, but in other examples can be carried out in inert gas under atmospheric pressure to limit evaporation losses. In some examples, the mixture of coarse ceramic particles 30, fine ceramic particle 32, and diamond particles 34 of second solid particle 16 may help reduce of inhibit the formation of surface nodules (e.g., silicon nodules) on outer major surface 26 after the melt infiltration process.

In some examples, after the melt infiltration step (52), the technique may include machining outer surface layer 17 to a second, final set of dimensions (54). This final set of dimensions may represent a final set of dimensions of the composite CMC article. The molten infiltration step (52) may increase the density of outer surface layer 17, thereby hardening outer surface layer 17 and making outer surface layer 17 more difficult to subsequently machine. As such, an amount of material removed during final machining step (54) may be reduced by machining outer surface layer 17 prior to melt infiltration, as in step (50) above, for a reduction in total machining time and/or cost.

In some examples, after the melt infiltration step (52) and/or after the final machining step (54), one or more optional outer coatings applied to the resultant composite article including, for example, a bond coat, an environmental barrier coating (EBC), an abradable coating layer, CMAS-resistant layer, or the like using one or more of the techniques discussed above.

EXAMPLES

Example 1—CMC Panels

A 6 inch by 7 inch woven preform ceramic matrix composite (CMC) panel with a BN fiber interface and CVI SiC matrix was infiltrated with a first slurry and dried to form an infiltrated CMC panel. A wetting agent solution (0.1% DYNOL solution) was sprayed on a surface of the infiltrated CMC panels.

A second slurry was prepared having 50 vol. % solid loading. The second slurry included fine ceramic particles of 2.5 µm nominal size silicon carbide (SiC) powder, a plasticizer of polyethylene glycol (PEG) (obtained from Alfa Aesar, CAS 25322-68-3), a binder of DURAMAX (0.5 wt. %; obtained from Dow Chemical), and a carrier material of water. The second slurry was ball milled for 4 hours. The second slurry was de-aired in a vacuum for 10 minutes at 20-25 inches Hg and sprayed 3 inches above a surface of the infiltrated CMC panels using 24 psi compressed air to form a surface layer. The surface layer was dried and machined by CNC machining to form a CMC article. The CMC article was melt infiltrated with a silicon alloy to form a CMC composite article.

Figure 4:
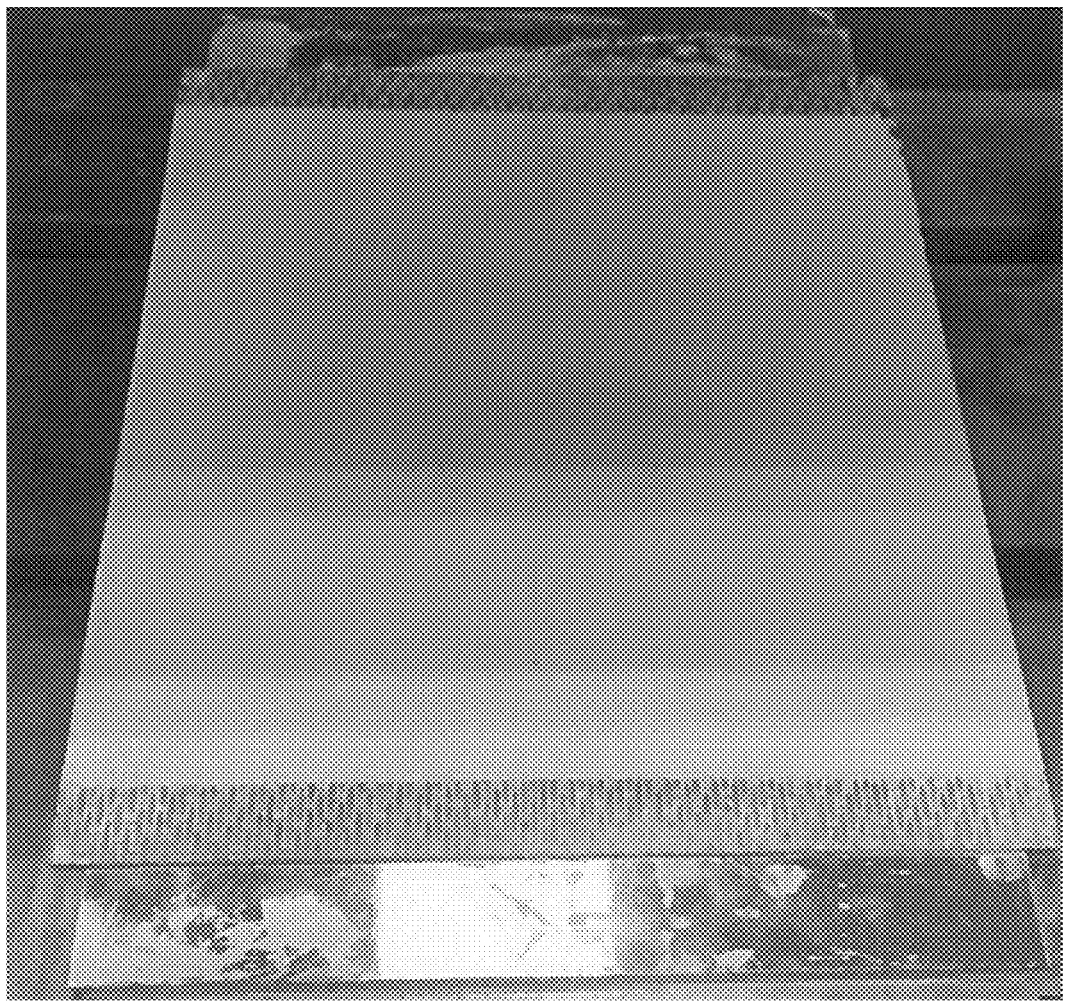
FIG. 4 is a photograph of the example CMC article of Example 1 that includes an infiltrated CMC having a surface layer formed from a slurry after machining but prior to melt infiltration.

FIG. 4 is a photograph of the example CMC article of Example 1 that includes an infiltrated CMC having a surface layer formed from a slurry after machining but prior to melt infiltration.

Example 2—CMC Sub-Element

A ceramic matrix composite (CMC) sub-element that included an inner bore was infiltrated with a first slurry and dried to form an infiltrated CMC sub-element. The inner bore was filled with a wetting agent solution (0.1% DYNOL solution) for 1 minute and drained, then filled with the first slurry and drained.

A second slurry was prepared having 50 vol. % solid loading. The second slurry included fine ceramic particles of 2.5 µm nominal size silicon carbide (SiC) powder, a plasticizer of polyethylene glycol (PEG) (obtained from Alfa Aesar, CAS 25322-68-3), a binder of DURAMAX (0.5 wt. %; obtained from Dow Chemical), and a carrier material of water. The second slurry was ball milled for 4 hours. The second slurry was de-aired in a vacuum for 10 minutes at 20-25 inches Hg and dip coated to form a surface layer in the inner bore. The bore was filled with the second slurry on a first end for 1 minute and drained, then filled with the second slurry from an opposite end for 1 minute and drained. The process of filling and draining may be repeated until a desired thickness is achieved. The surface layer was dried and machined by CNC machining to form a CMC article. The article was melt infiltrated with a silicon alloy (Si—B) to form a CMC composite article. After melt infiltration, the CMC composite article was machined to achieve a final surface layer thickness of 3-20 mils.

Figure 5A:
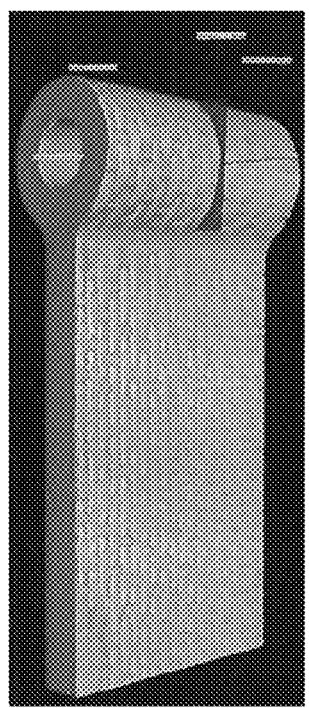
FIG. 5A is a perspective view of a CT scan of the melt-infiltrated sub-element that includes a surface layer on the inner bore.
Figure 5B:
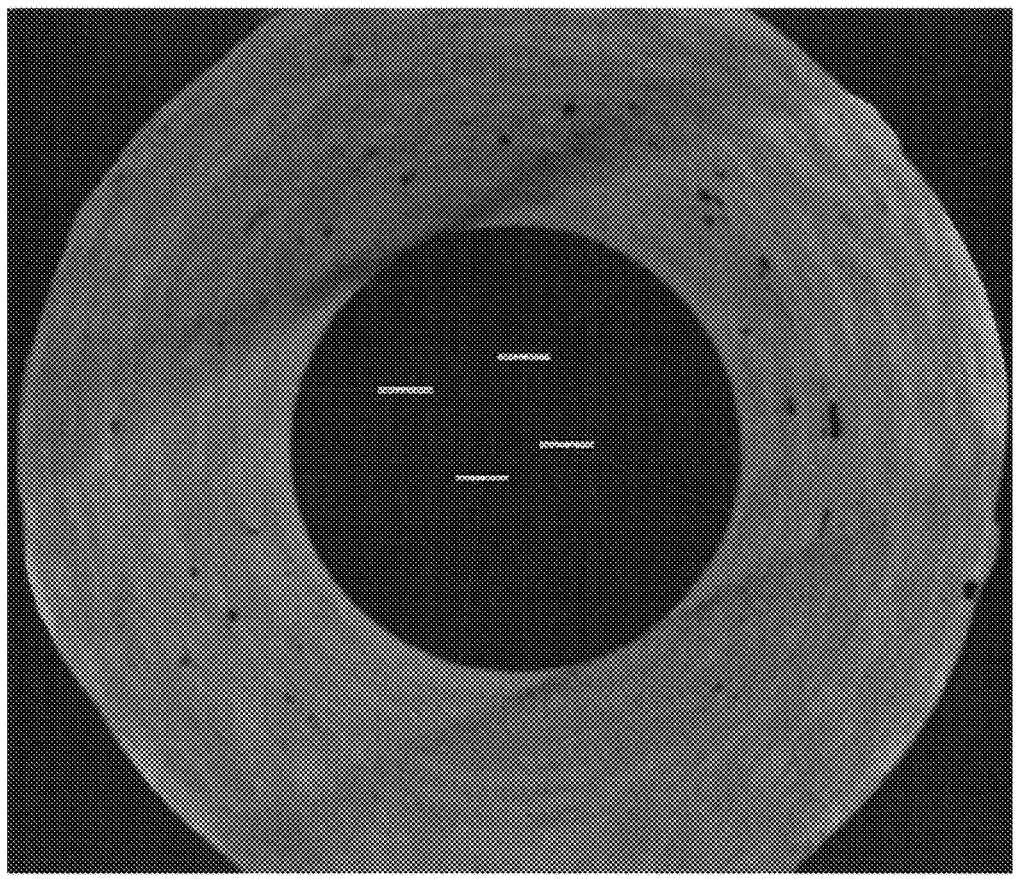
FIG. 5B is a cross-sectional view of the CT scan of FIG. 5A.

FIG. 5A is a perspective view of a CT scan of the melt-infiltrated sub-element that includes an outer surface layer as described herein. FIG. 5B is a cross-sectional view of the CT scan of FIG. 5A. As seen in FIG. 5B, the sub-element has a smooth surface on an interior of the inner diameter of the bore. This process was compared to a sub-component that had a surface coat on the inner bore that was processed through melt infiltration instead of machining in the "green" state prior to the melt infiltration. The result was an inner bore of solid silicon carbide with a wall thickness averaging 0.125". The method of manufacturing was to peck drill the inner bore to a size of 0.25" and then use a diamond grinding pin to machine the inner bore to size. The process of Example 2 reduced a total machining time by 97% and tooling cost by 90% compared to conventional post-melt infiltration machining.

Example 3—Polyethylene Glycol Viscosity by Composition

A viscosity of slurries with six different polyethylene glycol (average molecular weight of 1,500 g/mol) contents: 0.08 wt. %, 0.33 wt. %, 1.31 wt. %, 2.98 wt. %, 5.29 wt. %, and 11.87 wt. %. was analyzed using a viscometer (Brookfield DV-II Pro Viscometer). A viscosity of each composition was measured at speeds from 120 RPM down to 40 RPM in 10 RPM increments. An average time between a first and a last measurement was 1 minute and 52 seconds. The spindle size was 66. FIG. 7 is a graph of viscosity (centipoise) for the six slurries with different polyethylene glycol contents. As polyethylene glycol content increases, a viscosity of the composition generally increases.

Example 4—Polyethylene Glycol Viscosity Over Time

A viscosity of a slurry with 0.33 wt % polyethylene glycol (average molecular weight of 1,500 g/mol) was measured over a period of time. A viscosity of the composition was measured at speeds from 120 RPM down to 40 RPM in 10 RPM increments. An average time between a first and a last measurement was 63.3 seconds. An elapsed time between a first measurement and a last measurement was 51 minutes and 47 seconds. The spindle size was 66. FIG. 6 is a graph of viscosity (centipoise) for six different measurements, with measurement 6 occurring immediately after stirring the sample. As seen in FIG. 6, viscosity increases over time due to particle settling, and changes back to original viscosity measurement after stirring.

Various examples have been described. These and other examples are within the scope of the following claims.

What is claimed is:

1. A method comprising:
   depositing a slurry on a surface of an infiltrated ceramic matrix composite (CMC), wherein the slurry comprises a carrier material, a binder, a plasticizer, and solid particles, wherein the solid particles comprise a plurality of fine ceramic particles defining a fine particle average size less than about 5 micrometers, wherein the slurry comprises greater than about 30 percent by volume (vol. %) of the carrier material, wherein the slurry comprises 0.1 percent by weight (wt. %) to 12 wt. % of the plasticizer, and wherein the binder is different from the plasticizer;
   drying the slurry to form an article having an outer surface layer comprising the solid particles, the binder, and the plasticizer on the infiltrated CMC;
   machining at least a portion of the outer surface layer of the article; and
   infiltrating the article with a molten infiltrant after machining the article to form a composite article.

2. The method of claim 1, wherein the slurry is a second slurry and the particles are second solid particles, the method further comprising, prior to depositing the second slurry on the surface of the infiltrated CMC:
  infiltrating a ceramic matrix composite (CMC) substrate with a first slurry to at least partially fill at least some inner spaces of the CMC substrate, wherein the first slurry comprises first solid particles comprising a first ceramic material; and
  drying the first slurry to form the infiltrated CMC, wherein the CMC comprises the first solid particles.

3. The method of claim 1, wherein the plasticizer comprises at least one of poly ethylene glycol and poly ethylene imine.

4. The method of claim 1, wherein the slurry comprises about 0.1 percent by weight (wt. %) to about 5 wt. % of the binder.

5. The method of claim 1, wherein the solid particles comprise at least one of boron carbide, silicon carbide, silicon nitride, or molybdenum carbide.

6. The method of claim 1, wherein the solid particles further comprise a plurality of coarse ceramic particles defining a coarse particle average size, wherein the fine particle average size is less than the coarse particle average size.

7. The method of claim 6, wherein the solid particles comprise greater than about 75 percent by volume (vol. %) of the plurality of fine ceramic particles.

8. The method of claim 6, wherein the coarse particle average size is between about 10 micrometers (μm) and about 20 (μm) and the fine particle average size is between about 0.5 (μm) and about 5 (μm).

9. The method of claim 1, wherein the slurry defines a viscosity of less than about 1000 centipoise.

10. The method of claim 1, wherein the slurry comprises greater than about 10 percent by volume (vol. %) of the solid particles.

11. The method of claim 1, wherein the solid particles further comprise a plurality of reactive particles comprising at least one of graphite, diamond, carbon black, molybdenum, or tungsten.

12. The method of claim 11, wherein the solid particles comprise between about 1 percent by volume (vol. %) and about 10 vol. % of the plurality of reactive particles.

13. The method of claim 1, further comprising mechanically smoothing the slurry after depositing the slurry and before the slurry has dried.

14. The method of claim 2, wherein drying the second slurry forms a surface layer comprising the second solid particles between the outer surface layer and the CMC substrate.

15. The method of claim 2, wherein the outer surface layer is machined to a first set of dimensions prior to infiltrating the article with the molten infiltrant, further comprising machining the outer surface layer to a second set of dimensions after infiltrating the article with the molten infiltrant.

16. The method of claim 1, wherein the slurry comprises between about 30 percent by volume (vol. %) and about 60 vol. % of the carrier material.

* * * * *